No. 649,316. Patented May 8, 1900.
I. LAMBERT.
FILTERING STOPPER.
(Application filed Apr. 24, 1899.)

(No Model.)

Witnesses.
Julius Lutz.
Isaac B. Owens.

Inventor
Isidore Lambert.
By [Attorneys]

UNITED STATES PATENT OFFICE.

ISIDORE LAMBERT, OF PARIS, FRANCE.

FILTERING-STOPPER.

SPECIFICATION forming part of Letters Patent No. 649,316, dated May 8, 1900.

Application filed April 24, 1899. Serial No. 714,272. (No model.)

*To all whom it may concern:*

Be it known that I, ISIDORE LAMBERT, of 14 Rue des Pyramides, in the city of Paris, in the Republic of France, have invented an Improved Filtering-Stopper, of which the following is a full, clear, and exact description.

This invention relates to a perforated and hollow stopper containing filtering, antiseptic, purifying, or other substances, such stopper being adapted for use with bottles, jars, flasks, cans, or the like for purifying the water, milk, or other liquid contained therein as it is used.

This filtering-stopper enables the soldier, for example, to rapidly fill his can with water without regard to its quality, and this water is purified as he drinks it, filtration taking place by means of the suction necessary to draw the water into the mouth, whereby it is caused to traverse the filtering substances contained in the stopper. My invention is also applicable to feeding-bottles and all other receptacles for liquids.

My invention will be readily understood by reference to the accompanying drawings, which are given by way of example, and in which—

Figure 1:
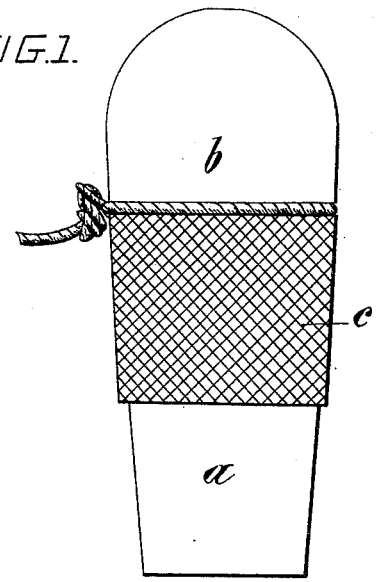
Figure 3:
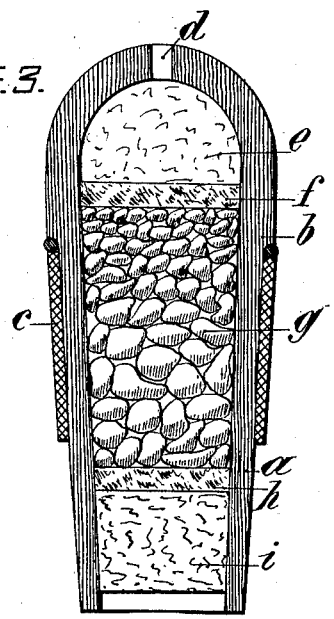
Figure 2:
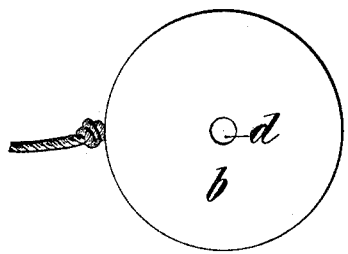
Figure 4:
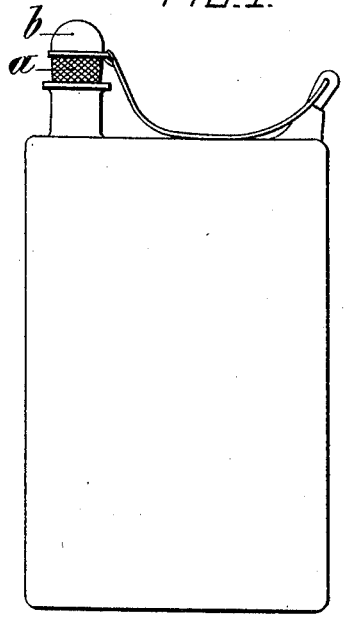

Figure 1 represents my filtering-stopper in elevation upon an exaggerated scale. Fig. 2 is a corresponding plan view. Fig. 3 shows the same stopper in vertical section. Fig. 4 represents the application of my stopper to a soldier's flask.

In the various figures similar letters of reference indicate like parts.

As shown in the drawings, my stopper is slightly conical in form and is provided with a shoulder $b$, which serves to maintain in position an india-rubber ring $c$, insuring the tightness of the stopper. The head of the stopper is rounded and is provided with a small passage $d$, communicating with the interior, which is made hollow for the reception of the filtering, purifying, antiseptic, or the like substances. These substances may be arranged in successive layers within the stopper, or they may be contained in small capsules or receptacles of any suitable kind, which are inserted in the stopper and traversed by the liquid as it is drawn into the mouth. Any appropriate filtering media may be employed, and I may mix such filtering substances with iron filings, tonics, febrifuges, or stimulants, or the beneficial chemical action of a suitable combination may be employed.

When my filtering-stopper contains merely a filtering medium, (preferably carbon which has been finely granulated,) I arrange at the outer end of the recess a thickness of felt $e$, a washer of asbestos fabric $f$ immediately above the filtering substance $g$, then at the lower portion a washer of asbestos fabric $h$, and finally a washer $i$, of felt, which maintains whole within the stopper. Other substances fulfilling the same purpose may of course be substituted for those enumerated above.

My filtering-stopper is preferably formed of wood; but I may also employ any other suitable material. The dimensions, forms, and accessories of the filtering-stopper may be likewise varied without in any way affecting thereby the principle of my invention.

I claim—

1. A filtering-stopper comprising a tapered hollow body of relatively-small porosity, provided with an exterior shoulder and a packing-ring engaging the same, the narrow end of said body being open entirely, while the wide end is rounded and substantially solid, with the exception of a relatively-narrow passage, and a filter located within said body, said filter containing a medicinal substance.

2. A filtering-stopper comprising a tapered hollow body of relatively-small porosity, the narrow end of said body being open entirely, while the wide end is rounded and substantially solid, with the exception of a relatively-narrow passage, and a filter located within said body.

3. A filtering-stopper comprising a hollow body or shell open at one end entirely and provided at the other end with a substantially-solid, perforated rounded head, and a filter located within said body.

The foregoing specification of my improved filtering-stopper signed by me this 10th day of April, 1899.

ISIDORE LAMBERT.

Witnesses:
EDWARD P. MACLEAN,
MAURICE H. PIGNET.